United States Patent
Kim et al.

(10) Patent No.: US 9,877,129 B2
(45) Date of Patent: Jan. 23, 2018

(54) DEVICE AND METHOD FOR PLAYING SOUND

(71) Applicant: GWANGJU INSTITUTE OF SCIENCE AND TECHNOLOGY, Buk-gu, Gwangju (KR)

(72) Inventors: Hong Kook Kim, Gwangju (KR); Chan Jun Chun, Gwangju (KR)

(73) Assignee: Gwangju Institute of Science and Technology, Gwangju (KR)

(*) Notice: Subject to any disclaimer, the term of this patent is extended or adjusted under 35 U.S.C. 154(b) by 0 days.

(21) Appl. No.: 14/435,720

(22) PCT Filed: Oct. 4, 2013

(86) PCT No.: PCT/KR2013/008909
§ 371 (c)(1),
(2) Date: Apr. 14, 2015

(87) PCT Pub. No.: WO2014/061931
PCT Pub. Date: Apr. 24, 2014

(65) Prior Publication Data
US 2015/0271618 A1    Sep. 24, 2015

(30) Foreign Application Priority Data

Oct. 18, 2012 (KR) .................. 10-2012-0116285

(51) Int. Cl.
*H04R 5/00* (2006.01)
*H04S 1/00* (2006.01)
(Continued)

(52) U.S. Cl.
CPC ............... *H04S 1/002* (2013.01); *H04R 5/04* (2013.01); *G06F 3/0412* (2013.01); *G10L 13/02* (2013.01)

(58) Field of Classification Search
CPC ......... H04R 5/04; H04S 1/002; G06F 3/0412; G10L 13/02
(Continued)

(56) References Cited

U.S. PATENT DOCUMENTS

| 6,983,251 B1* | 1/2006 | Umemoto | H04R 5/04 704/270 |
| 2004/0030425 A1* | 2/2004 | Yeakel | H04H 60/04 700/94 |

(Continued)

FOREIGN PATENT DOCUMENTS

| CN | 101789250 A | 7/2010 |
| CN | 102597946 A | 7/2012 |

(Continued)

OTHER PUBLICATIONS

Dan Barry. Sound source separation: Azimuth discriminiation and resynthesis. Proc. of the 7th Int. Conference on Digital Audio Effects. Oct. 8, 2004. Naples, Italy.

*Primary Examiner* — Vivian Chin
*Assistant Examiner* — Con P Tran
(74) *Attorney, Agent, or Firm* — Loza & Loza, LLP; Heidi Eisenhut

(57) ABSTRACT

The present invention extracts azimuth information on a sound source, read the touch state of a touch screen on which an image is displayed, and enables a sound source having azimuth information corresponding to a place touched on the image to be synthesized so as to be distinguished from other sound sources. According to the present invention, since it is possible to listen to the distinguished sound of a desired location on an image, a user may be provided with more satisfaction.

15 Claims, 9 Drawing Sheets

(51) Int. Cl.
*H04R 5/04* (2006.01)
*G06F 3/041* (2006.01)
*G10L 13/02* (2013.01)

(58) Field of Classification Search
USPC ............ 381/17, 388, 333, 87; 345/177, 173; 704/261, 258
See application file for complete search history.

(56) References Cited

U.S. PATENT DOCUMENTS

| | | |
|---|---|---|
| 2011/0116665 A1 | 5/2011 | King et al. |
| 2012/0105847 A1 | 5/2012 | Kerstan |
| 2012/0254751 A1 | 10/2012 | Kim |
| 2013/0342731 A1* | 12/2013 | Lee .................... H04N 5/23293 348/231.4 |

FOREIGN PATENT DOCUMENTS

| | | |
|---|---|---|
| JP | 2009260787 A | 11/2009 |
| KR | 10-2005-0063613 A | 6/2005 |
| KR | 10-2009-0041878 A | 4/2009 |
| KR | 10-2009-0111943 A | 10/2009 |

\* cited by examiner

DEVICE AND METHOD FOR PLAYING SOUND

BACKGROUND OF THE INVENTION

1. Field of the Invention

The embodiment relates to a sound reproducing apparatus and a sound reproducing method.

2. Description of the Related Art

A technology of finding an azimuth of a sound source contained in a stereo sound by using the stereo sound has been generally known to those skilled in the art. The technology is disclosed in a paper co-written by Dan barryand Bob Lawlor and having the title of "sound source separation: azimuth discrimination and resynthesis" (published in Proc. of the 7th Int. conference on Digital Audio Effects (DAFX-04), Naples, Italy, Oct. 5-8, 2004). According to the related art, the azimuth of the sound source may be found by using an IID (Interaural Intensity Difference) of a sound recorded through a stereo microphone. There has been provided a technology of reproducing each sound source from various sounds which are synthesized with each other by using the IID and stored. According to the technology, only each sound is reproduced, and a technology suitable for the use of the user is not applied.

SUMMARY OF THE INVENTION

The embodiment provides a sound reproducing apparatus capable of actively utilizing the information of a sound source by using a stereo sound, and a sound reproducing method. Accordingly, the embodiment is to provide an apparatus and a method capable of satisfying various needs of consumers In one embodiment, a sound reproducing apparatus includes: an azimuth information extractor to extract azimuth information of a sound source from at least one stereo sound information; a touch screen to display an image; an image controller to read out at least a touch state of the touch screen; and a synthesizer to characterize and synthesize a sound source, which has azimuth information corresponding to a touch point on the image, according to the touch state by differentiating the sound source from other sound sources.

In another embodiment, a sound reproducing method includes: touching a touch screen on which an image is displayed; extracting at least azimuth information corresponding to a touch point; identifying a matching sound source, which has an azimuth matched with azimuth information of the image, from at least one stereo sound; and characterizing the matching sound source when the matching sound source is synthesized with a sound source other than the matching sound source and output.

In still another embodiment, a sound reproducing method includes: touching a touch screen on which image information corresponding to at least one stereo sound information is displayed; identifying a matching source corresponding a position and an azimuth of a touch point on the image information; and characterizing the matching sound source when the matching sound source is synthesized with a sound source other than the matching sound source and output.

According to the embodiments, various needs of a user can be satisfied by utilizing the azimuth information of the sound source. The sound and the image can be reproduced together by utilizing the image information as well as the sound information, so that the embodiment is more actively applicable to various application fields.

DETAILED DESCRIPTION OF THE INVENTION

<Sound Reproducing Apparatus>

Figure 1:
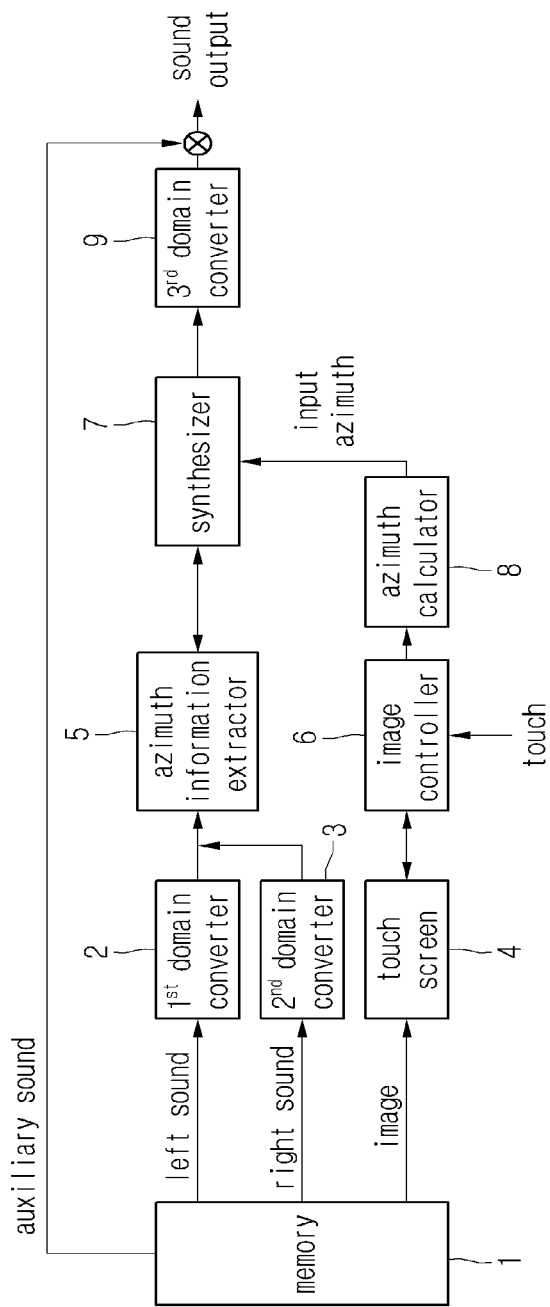
FIG. 1 is a block diagram showing the structure of a sound reproducing apparatus according to the embodiment.

FIG. 1 is a block diagram showing the structure of a sound reproducing apparatus according to the embodiment.

The sound reproducing apparatus suggested in FIG. 1 may include various devices. For example, the sound reproducing apparatus may include a portable terminal, a digital camera, a display device, and a computer, but the embodiment is not limited thereto. The sound reproducing apparatus includes a memory 1 to store stereo sound information and image information. The information of a stereo sound includes a left sound information and a right sound information stored as time domain information, and the left sound information and the right sound information are input into a first domain converter 2 and a second domain converter 3, respectively, to be converted into frequency domain information. The stereo sound information including the frequency-related information is input into an azimuth information extractor 5 so that the azimuth of each sound source contained in the stereo sound to provide an individual sound is found.

Hereinafter, the operation of the azimuth information extractor 5 will be described in more detail.

Equation 1 is expressed by modeling the stereo sound information.

$$L(t) = \sum_{j=1}^{J} Pl_j S_j(t)$$

$$R(t) = \sum_{j=1}^{J} Pr_j S_j(t)$$

Equation 1

In Equation 1, $S_j$ represents a $j^{th}$ sound source, $Pl_j$ and $Pr_j$ represent left and right panning coefficients of the $j^{th}$ sound source, and L and R represent left and right sounds, respectively. In this case, since the L(t) and the R(t) are generally-known information, the intensity information of left and right sounds for a specific sound source can be found. According to Equation 1, the intensity ratio of the $j^{th}$ sound source may be expressed as following Equation 2.

$$g(j) = \frac{Pl_j}{Pr_j} \quad \text{Equation 2}$$

The intensity ratio is a ratio of the left sound to the right sound in the intensity. The intensities of the left and right sounds may vary depending on the azimuth in which the sound source is placed about the position of a stereo microphone. Accordingly, for example, a sound source (for example, $j^{th}$ sound source) placed at a left side of the microphone may be reproduced with a greater left sound intensity. In this case, the intensity ratio g(j) of the $j^{th}$ sound source may be greater than 1. Further, if the sound source is placed at the lifter side of the microphone, the intensity of the left sound may be more increased. The same principle may be applied to the case that the sound source is placed at the right side of the microphone.

Accordingly, the azimuth information of the sound source about the stereo microphone can be found by using the intensity ratio g(j). The azimuth information of the sound source may be expressed through the conversion to the value of the g(j).

Figure 2:
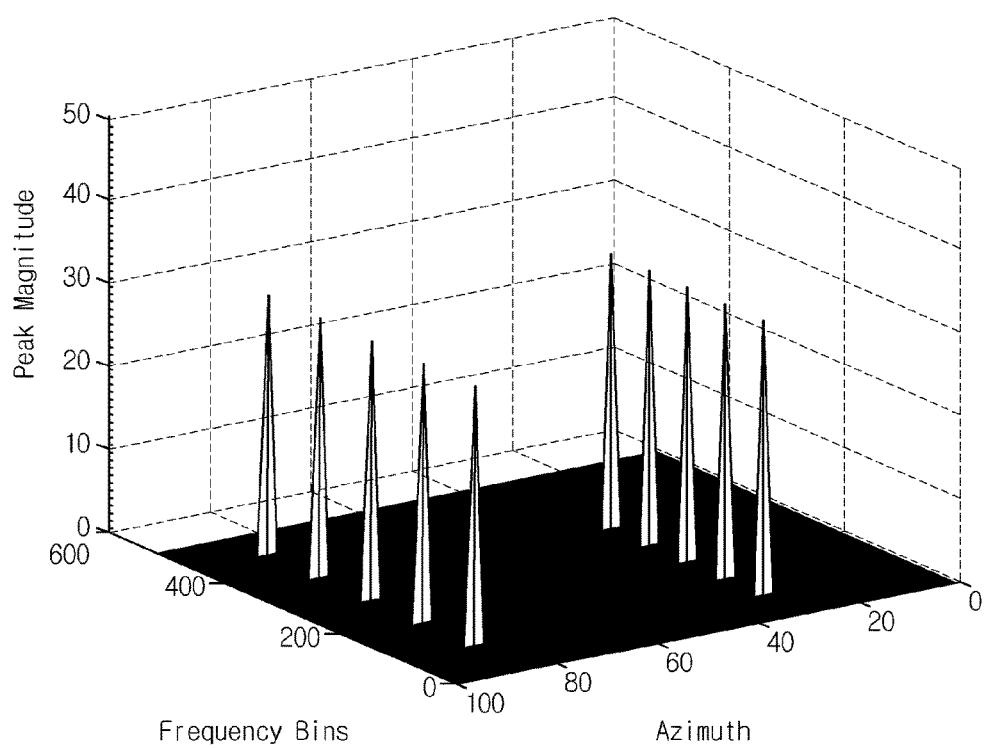
FIG. 2 is a graph representing calculation results of azimuth information of two sound sources.

The calculation results of azimuth information for two sound sources are shown in FIG. 2. Referring to FIG. 2, the g values are scaled as values in the range of 0 to 100 and expressed as azimuth information. In the case of a sound source placed at a predetermined azimuth, harmonics are represented as frequency bins at a predetermined interval. In the case of a musical instrument, since specific harmonics are typically represented, the magnitude of each frequency is represented.

As described above, the azimuth information of each sound source may be found by using stereo sound information. The scheme of finding the azimuth information of each sound source by using the stereo sound information is called an interaural intensity difference (IID), which has already been suggested. According to the embodiment, the azimuth information may be found through various schemes as well as the IID scheme.

The azimuth information and the sound information of each sound source extracted through the scheme are provided to a synthesizer 7. The synthesizer 7 may combine a sound source placed at a specific position on image information matched with specific azimuth information by characterizing the sound source based on the azimuth information. The specific position may be input in the form of azimuth information input from an outside in the form of user indication.

Hereinafter, the structure in which the azimuth information is input from the outside will be described in more detail. The memory 1 stores image information together with sound information. The image information and the sound information may be stored in different memories, and at least one of a sound or an image may be transmitted through a wired communication or a wireless communication. The image information is output to a touch screen 4. In this case, the touch screen 4 may include a unit to reproduce the image, a unit to detect the touch state of an external object, a unit to information-process the image in the form of an electric signal, and a unit to express a touch point on the touch screen 4. The structure and the operation of the touch screen 4 are generally known to those skilled in the art. For example, the touch screen 4 may include a touch screen of a hand-held device which has been recently spotlighted.

If the touch screen 4 is touched, an image controller 6 may read out a touch signal to find the touch point touched on the touch screen and control the touch screen based on the read-out touch state. For example, the touch point may be expressed as a shadowed area, or indicated through a cursor position, and the shadowed area may be moved/enlarged/reduced depending on touch variation. The azimuth calculator 8 calculates touch information representing the azimuth and the area of the touch point with respect to a whole image. The azimuth calculator 8 may utilize information obtained by matching the azimuth of the azimuth information extractor 5 obtained through a pre-scaling process with the azimuth of the sound source corresponding to the whole image. Alternatively, the synthesizer 7 makes determination to match the touch point touched on the touch screen with the azimuth calculated by the azimuth information extractor 5 without the azimuth calculator 8. In this case, it may be understood to those skilled in the art that the touch point on the image may have a predetermined corresponding relation with the azimuth information calculated from the sound source in the synthesizer 7.

The synthesizer 7 determines a sound source, in which the touch point (for example, the azimuth information indicated by the user) is matched with the azimuth extracted by the azimuth information extractor 5, and combines the sound source placed on the touch point, that is, the $j^{th}$ sound source on the matched position by characterizing the sound source. For example, in order to characterize the sound source, only a sound source placed at a position matched with the touch point may be synthesized, and other sound sources may be reproduced without being synthesized. In this case, only the sound source on the touch point may be reproduced. Naturally, on the contrary, the reproducing process may be performed by combining only other sound sources exclusive of the sound source placed on the position matched with the touch point. In this case, only the sound source on the touch point may be excluded from the reproducing process.

The sound source synthesized in the synthesizer 7 may be converted into the information in a time domain through a third domain converter 9 and output as an audible sound. Meanwhile, if auxiliary sounds such as vocals and sound sources of additional musical instruments are additionally provided in the memory 1, the auxiliary sounds are synthesized with the time-domain sound signal, which is output through the conversion of the third domain converter 9, and output.

According to the sound reproducing apparatus, only a user-desired sound source at a position of an image can be characterized and reproduced. Accordingly, the convenience and the feeling of the satisfaction of the user can be enhanced. In addition, when images are provided in the form of a moving picture, the sound may be continuously manipulated simultaneously with the reproduction of the moving picture, so that the feeling of the satisfactory of the user can be enhanced. If the images are provided in the form of a moving picture, the images may be synchronized with stereo sound information.

<Sound Reproducing Method>

The sound reproducing apparatus is applied to a sound reproducing method, so that the effects of the sound reproducing method can be more enhanced and more easily understood. Accordingly, the description of the sound reproducing apparatus may be applied to the description of the sound reproducing method unless otherwise indicated.

First Embodiment

Figure 3:
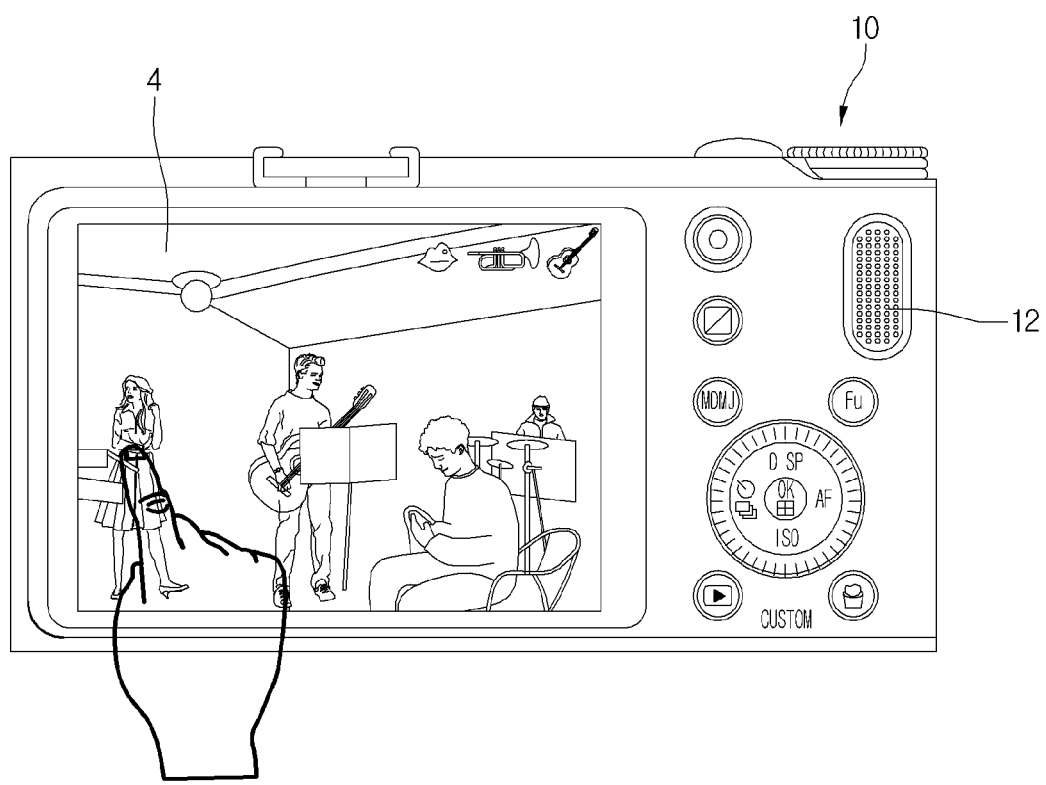
FIG. 3 is a view to explain a sound reproducing method according to the first embodiment.
Figure 4:
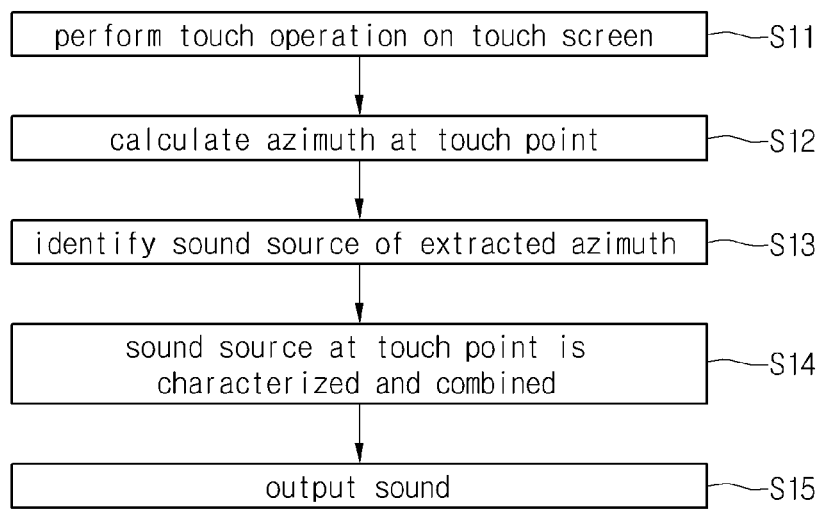
FIG. 4 is a flowchart to explain the sound reproducing method according to the first embodiment.

FIG. 3 is a view to explain a sound reproducing method according to the first embodiment, and FIG. 4 is a flowchart to explain the sound reproducing method according to the first embodiment. Referring to FIG. 3, an image reproducing device 10 embodied as a portable terminal, a digital camera, a display device, and a computer includes a touch screen 4 and a speaker 12. An image is reproduced on the touch screen 4, and a user may touch the touch screen 4 by using a predetermined tool such as a finger. In this case, a sound source at a touch point may be characterized and reproduced. As one example of the characterization, only the sound source at the touch point may be reproduced, excluded from the reproduction, suppressed in the reproduction, or boosted in the reproduction.

Hereinafter, the operation procedure of the sound reproducing method according to the first embodiment will be described in more detail with reference to FIG. 4. A touch screen is touched (Step S11). The image reproducing device 10 extracts an azimuth at a touch point (step S12) and identifies a sound source of the extracted azimuth (step S13). In the step of identifying the sound source of the extracted azimuth, the structure and the method described in the sound reproducing apparatus may be employed. In this case, the azimuth may be set about a left-right directional axis based on the image of FIG. 3. For example, the azimuth of the leftmost side of the image is set as "0", and the azimuth of the rightmost side of the image is set as "100". Thereafter, the identified sound source is characterized as the sound source at a touch point and synthesized (step S14). The synthesized sound is output through the speaker 12 (step S15). The user can hear the sound characterized as the sound source at the touch point The step (step S12) of extracting the azimuth at the touch point and the step (step S13) of identifying the sound source of the extracted azimuth may be performed together. In this case, it may be understood to those skilled in the art that the sound source at the touch point is extracted.

According to the above method, the user can expect to hear the sound characterized with respect to the source indicated by the user while viewing the image. Accordingly, the needs of the user can be variously satisfied.

Second Embodiment

The second embodiment will be incorporated in the first embodiment. In the following description of the second embodiment, the description of the first embodiment will be employed unless otherwise indicated.

Figure 5:
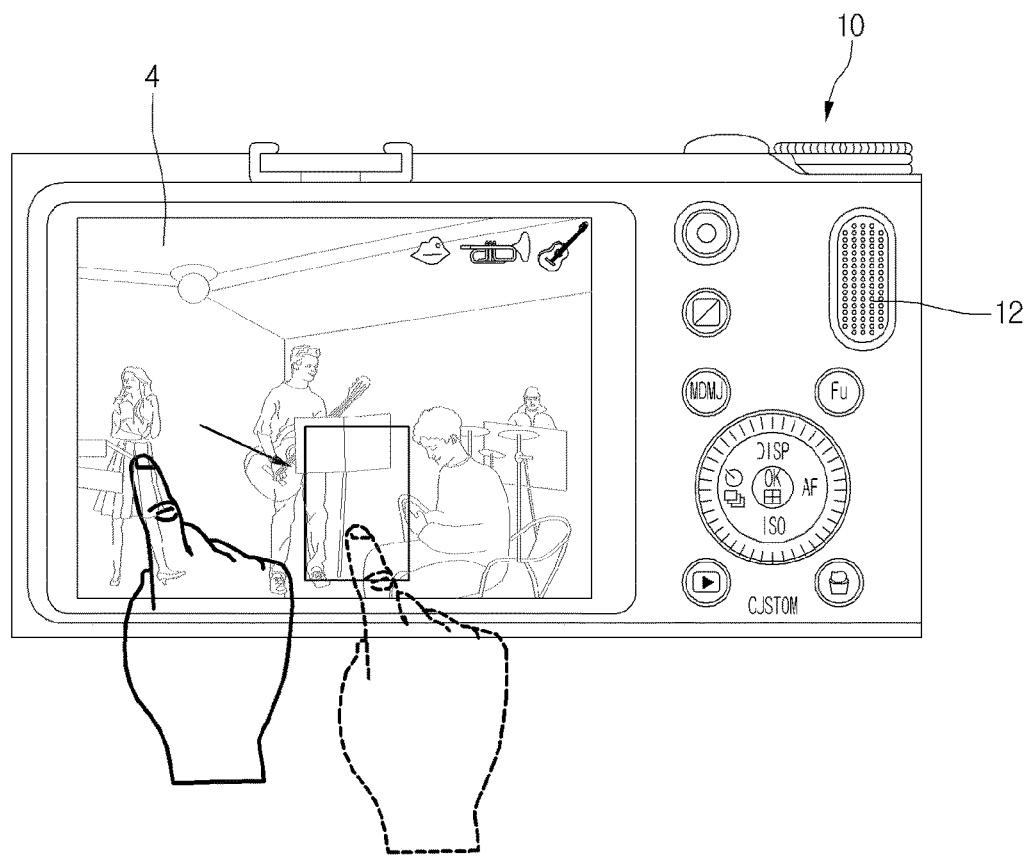
FIG. 5 is a view to explain a sound reproducing method according to the second embodiment.
Figure 6:
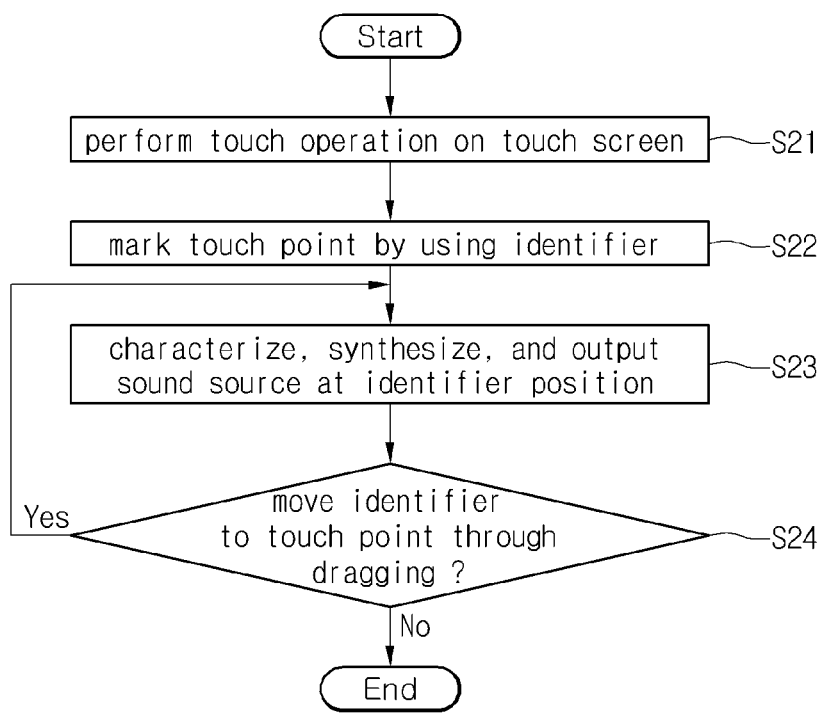
FIG. 6 is a flowchart to explain the sound reproducing method according to the second embodiment.

FIG. 5 is a view to explain a sound reproducing method according to the second embodiment, and FIG. 6 is a flowchart to explain the sound reproducing method according to the second embodiment. Referring to FIG. 5, an image is reproduced on the touch screen 4, and a user may touch the touch screen 4 by using a predetermined tool such as a finger. The image controller 6 detects the touch state and controls the touch screen 4 to display an identifier having a predetermined shape. Although the identifier is shown in the shape of a square shadowed area in FIG. 5, the identifier may be used in the form of a cursor or a cross. Then, a sound source contained in the area marked by the identifier and having an azimuth may be characterized, synthesized, and reproduced. As one example of the characterization, only the sound source at the touch point may be reproduced, excluded from the reproduction, suppressed in the reproduction, or boosted in the reproduction. If the user drags the identifier, a sound source contained in an area of the image indicated by the dragged identifier may be characterized, synthesized, and reproduced.

Hereinafter, the operating procedure of the sound reproducing method according to the first embodiment will be described in more detail with reference to FIG. 6. First, the touch screen is touched (step S21). The image reproducing device 10 displays the touch point by using the identifier having a predetermined shape (step S22). The sound source having the azimuth contained in an area indicated by the identifier may be characterized, synthesized, and output (step S23). In this case, it can be understood that the steps of identifying, combining, and outputting the synthesized sound source correspond to the step of extracting the azimuth at the touch point according to the first embodiment (step S12), identifying the sound source of the extracted azimuth (step S13), combining the sound source (step S14), and outputting the synthesized sound source (step S15).

The user may drag the identifier while viewing the identifier on the image (step S24). When the user drags the identifier, the sound source contained in the identifier is detected again, so that the related sound source may be characterized, synthesized, and output.

According to the sound reproducing method of the second embodiment, the user can reproduce a sound source at a position desired by a user while viewing the image.

Third Embodiment

The third embodiment will be incorporated in the first and second embodiments. In the following description of the third embodiment, the description of the first and second embodiments will be employed unless otherwise indicated.

Figure 7:
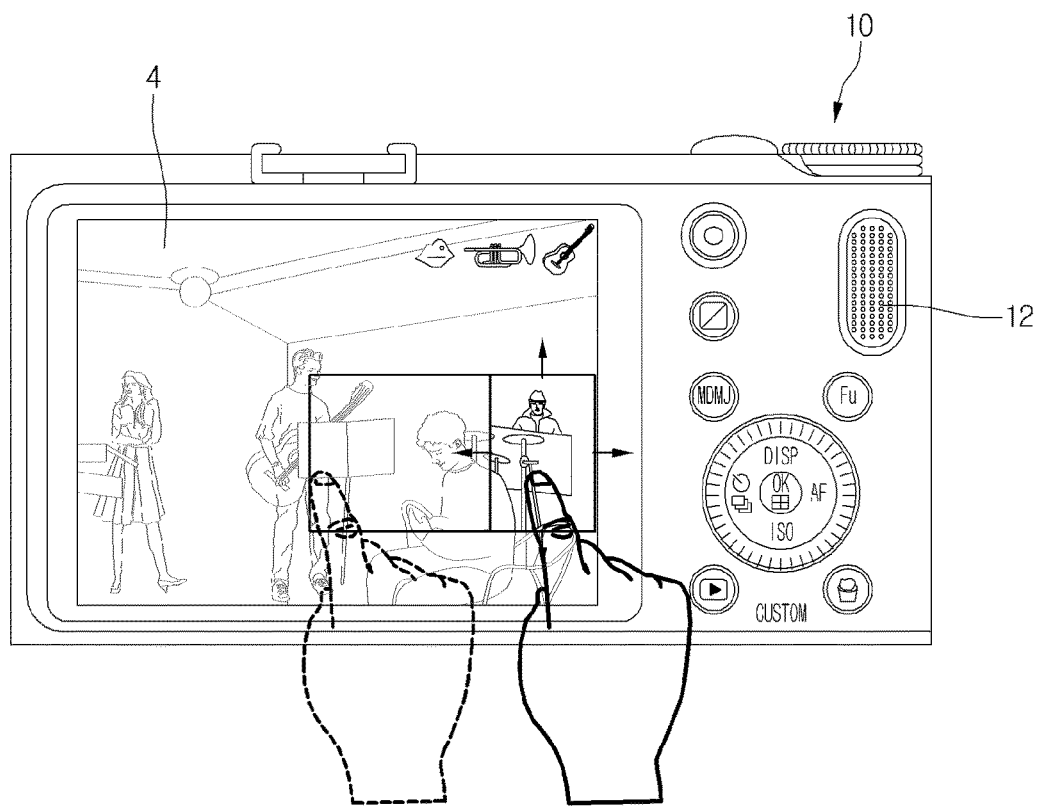
FIG. 7 is a view to explain a sound reproducing method according to the third embodiment.
Figure 8:
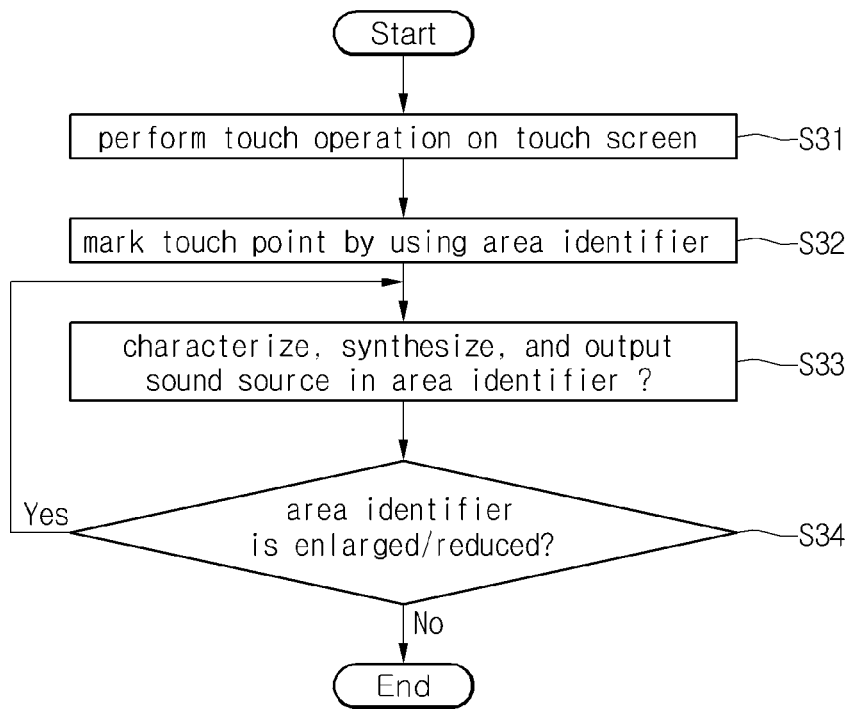
FIG. 8 is a flowchart to explain the sound reproducing method according to the third embodiment.

FIG. 7 is a view to explain a sound reproducing method according to the third embodiment, and FIG. 8 is a flowchart to explain the sound reproducing method according to the third embodiment. Referring to FIG. 7, an image is reproduced on the touch screen 4, and a user may touch the touch screen 4 by using a predetermined tool such as a finger. The image controller 6 detects the touch state and controls the touch screen 4 to display an area identifier having a predetermined shape. The identifier is shown in the shape of a square shadowed area in FIG. 7. A sound source contained in the area marked by the area identifier and having an azimuth may be characterized, synthesized, and reproduced. In this case, the azimuth calculator 8 may not only calculate an azimuth at a specific point, but also calculate information of the area of the azimuth indicated by the area identifier, so that the azimuth and the information of the area of the azimuth can be transmitted to the synthesizer 7. As one example of the characterization, only the sound source at the touch point may be reproduced, excluded from the reproduction, suppressed in the reproduction, or boosted in the reproduction. If the user enlarges or reduces the area identifier, the sound source contained in an area indicated by the enlarged or reduced area identifier may be characterized, synthesized, and reproduced.

Hereinafter, the operating procedure of the sound reproducing method according to the first embodiment will be described in more detail with reference to FIG. 8. First, the touch screen is touched (step S31). The image reproducing device 10 displays the touch point by using the identifier having a predetermined shape (step S32). The sound source contained in an area indicated by the area identifier may be characterized, synthesized, and output (step S33). In this case, it can be understood that the steps of identifying, combining, and outputting the synthesized sound source correspond to the step of extracting the azimuth at the touch point according to the first embodiment (step S12), identifying the sound source of the extracted azimuth (step S13), combining the sound source (step S14), and outputting the synthesized sound source (step S15).

The user may enlarge or reduce the area identifier while viewing the area identifier (step S34). When the user enlarges or reduces the identifier, the sound source contained in the area identifier is detected again, so that the related sound source may be characterized, synthesized, and output.

According to the sound reproducing method of the third embodiment, the user can reproduce a plurality of desired sound sources by conveniently selecting or removing the sound sources in real time while viewing image.

Fourth Embodiment

The fourth embodiment will be incorporated in the first to second embodiments. In the following description of the fourth embodiment, the description of the first and second embodiments will be employed unless otherwise indicated.

Figure 9:
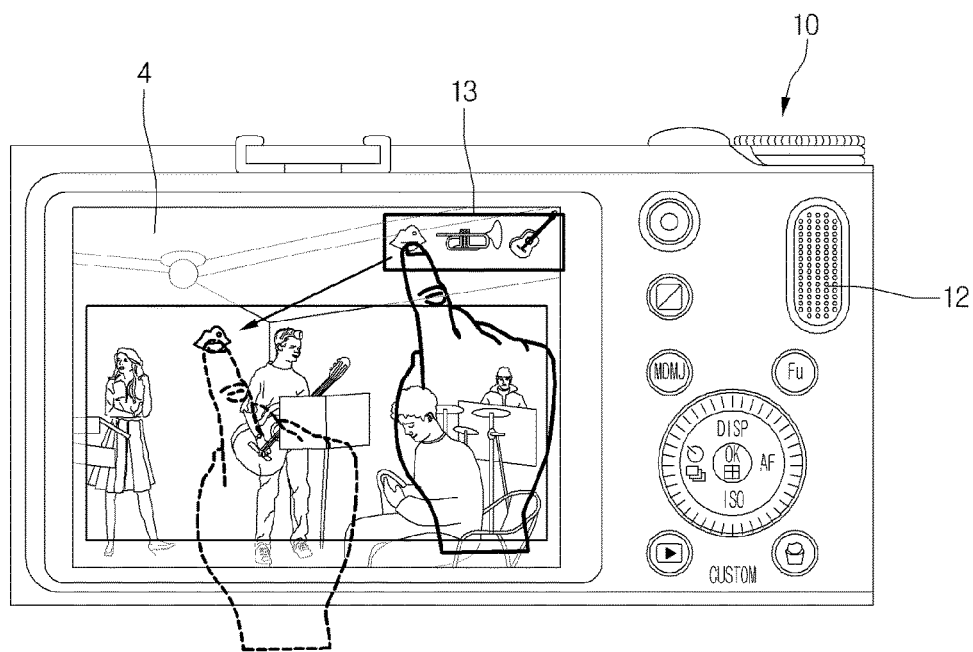
FIG. 9 is a view to explain a sound reproducing method according to the fourth embodiment.
Figure 10:
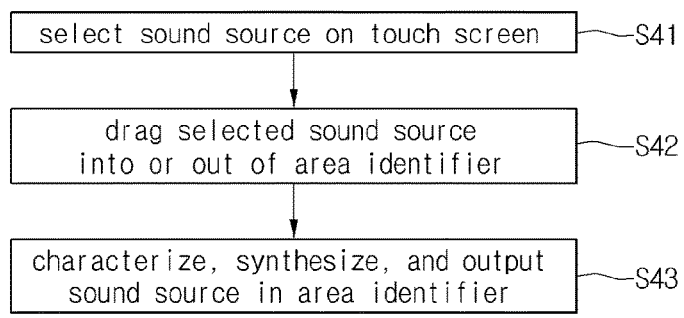
FIG. 10 is a flowchart to explain the sound reproducing method according to the fourth embodiment.

FIG. 9 is a view to explain a sound reproducing method according to the fourth embodiment, and FIG. 10 is a flowchart to explain the sound reproducing method according to the fourth embodiment. Referring to FIG. 9, an image is reproduced, and the area identifier is provided on the touch screen 4. A user may touch a predetermined sound source provided in an additional sound source unit 13 and drag the sound source into the area identifier. The image controller 6 detects the touch state so that the image of the selected and dragged sound source can be displayed on the touch screen 4. Sound sources may include a vocal provided in the shape of a lip and a wind instrument provided in the shape of a trumpet. As shown in FIG. 9, when the shape of the lip is dragged into the area identifier, the vocal of a singer may be characterized, synthesized, and reproduced together with an existing sound source provided in the area identifier. On the contrary, when an icon having the shape of the lip is moved out of the area identifier, the sound source contained in the area identifier may be characterized, synthesized, and reproduced in the state that the vocal is removed.

In this case, after the sound source corresponding to the shape of the lip as an auxiliary sound has been additionally stored in the memory (1 of FIG. 1), the sound source corresponding to the shape of the lip may be synthesized at an outer terminal of the third domain converter 9 so that the sound source corresponding to the shape of the lip may be output as a sound.

Hereinafter, the operating procedure of the sound reproducing method according to the fourth embodiment will be described in more detail with reference to FIG. 10. A sound source is selected by touching the touch screen (step S41). The selected sound source is dragged into or out of the area identifier (step S42). In this case, naturally, the image reproducing device 10 may display the drag state. For example, the sound source existing at a position in which the area identifier is placed, for example, existing in the area identifier may be characterized, synthesized, and output (step S43). In this case, if the sound source selected in step S42 is a vocal, the vocal may be output together with various musical instruments.

According to the sound reproducing method of the fourth embodiment, since a vocal including a great amount of unvoiced sound is different from a sound of a general musical instrument including a great amount of harmonic components, the vocal may be separately processed and then added or deleted. Therefore, the feeling of the satisfactory of the user for the combining and the reproducing of the vocal can be enhanced, and the selectivity of the sound can be enhanced according to one feature of the embodiments. Human voice has many non-harmonic components and many harmonic components while the musical instruments has the harmonic components more than the non-harmonic components. Accordingly, the embodiments are more preferably applicable to the case that there is a difficulty when extracting the azimuth information or identifying a sound.

The disclosure is not limited to the above embodiment, and may include other following embodiments. For example, description of the embodiment has been made in that azimuth information can be found about a left-right direction when one stereo microphone is provided, that is, one dimension is employed. However, the embodiments are not limited thereto, and 2-D azimuth information may be found and used for display devices having the left-right direction and the up-down direction when two stereo microphones are provided. In this case, a sound source may be characterized and reproduced by identifying the sound source regardless of the position of the sound source in the left-right direction and the up-down direction on the touch screen. Similarly, when three stereo microphones are provided, 3-D azimuth information may be found and used for display devices having a front-rear direction, a left-right direction, and an up-down direction. Even this case belongs to the scope of the disclosure.

In addition, the above description has been made in that the azimuth information extractor calculates the azimuth information through the HD scheme. However, the embodiments are not limited thereto, and the azimuth information may be calculated through another scheme additionally including a pre-treatment process or a post-treatment process for the sound source.

In addition, although the auxiliary sound is provided on the touch screen, the embodiments are not limited thereto. The auxiliary sound may be obtained through a button additionally provided in the sound reproducing apparatus.

According to the embodiments, various needs of a user can be satisfied by utilizing the azimuth information of the sound source, and the needs of the user for the reproduction of the sound and the image can be satisfied. A moving picture reproducing device, and a sound reproducing device, an image reproducing device, and an sound and image reproducing device representing higher utilization can be realized by actively utilizing sound information. For example, a work of reproducing only a sound by a musical instrument on the selected image or a work of removing only the sound can be performed by characterizing a musical instrument provided at a specific position of the image.

What is claimed is:
1. A sound reproducing apparatus comprising:
an azimuth information extractor to extract azimuth information of a sound source from at least one stereo sound information;
a touch screen to display an image;
an image controller to read out at least a touch state of the touch screen;
a memory to store the at least one stereo sound information, at least one auxiliary sound and at least one image, where each auxiliary sound in the at least one auxiliary sound corresponds to a unique icon on the touch screen; and a synthesizer to characterize and synthesize a sound source, which has azimuth information corresponding to a touch point on the image, according to the touch state by differentiating the sound source from other sound sources;

wherein the synthesizer synthesizes the sound source with the at least one auxiliary sound corresponding to a selected icon on the display screen;

wherein the image displays the type of sound corresponding to the image; and wherein the synthesizer process a human voice separately from a musical instrument sound, when a vocal sound source is selected via the touch screen.

2. The sound reproducing apparatus of claim 1, further comprising an azimuth calculator to calculate touch information of the touch point on the image, which includes at least the azimuth information corresponding to the touch point based on the touch state read out by the image controller.

3. The sound reproducing apparatus of claim 2, wherein the touch information comprises area information.

4. The sound reproducing apparatus of claim 2, wherein azimuth information included in information of the image and the azimuth information of the sound source are scaled such that the azimuth information included in the information of the image is matched with the azimuth information of the sound source.

5. The sound reproducing apparatus of claim 1, wherein the at least one stereo sound information and at least one image are transmitted through a wired scheme or a wireless scheme.

6. The sound reproducing apparatus of claim 1, further comprising:
a domain converter provided at a front end of the azimuth information extractor to convert time domain information into frequency domain information; and
a domain converter provided at a rear end of the synthesizer to convert the frequency domain information into time domain information.

7. A sound reproducing method comprising:
touching a touch screen on which image information corresponding to at least one stereo sound information is displayed;
identifying a matching source corresponding a position and an azimuth of a touch point on the image information;
characterizing the matching sound source when the matching sound source is synthesized with a sound source other than the matching sound source and output;
selecting an icon of an auxiliary sound provided on the touch screen from a plurality of icons;
moving the selected icon of the auxiliary sound into the area identifier or out of the area identifier; and
outputting the selected icon together with the auxiliary sound when the icon is provided in the area identifier, and
processing a human voice separately from a musical instrument sound, when a vocal sound source is selected via the touch screen;
wherein the auxiliary sound of the selected icon is stored in a memory;
wherein the image displays the type of sound corresponding to the image.

8. The sound reproducing method of claim 7, wherein the characterizing of the matching sound source comprises at least one of works of reproducing, deleting, suppressing, and enhancing only the matching sound source.

9. The sound reproducing method of claim 7, further comprising displaying an identifier on the touched point of the touch screen wherein the identifier is dragged.

10. The sound reproducing method of claim 9, wherein the identifier serves as an area identifier having a predetermined area.

11. The sound reproducing method of claim 7, further comprising displaying an area identifier having a predetermined area on the touched point of the touch screen, wherein the area identifier is controlled such that the area identifier is subject to one of enlargement, reducing, and movement.

12. The sound reproducing method of claim 7, wherein the stereo sound information corresponds to the image information in terms of time.

13. The sound reproducing method of claim 7, wherein the auxiliary sound comprises vocal information.

14. The sound reproducing method of claim 7, wherein the at least one stereo sound information comprises information of at least two sound sources.

15. The sound reproducing apparatus of claim 7, wherein azimuth information included in the image information and azimuth information of the at least one stereo sound information are scaled such that the azimuth information included in the image information is matched with the azimuth information of the at least one stereo sound information.

* * * * *